June 26, 1951 — E. M. OSTLUND — 2,557,994

OBJECT DETECTOR

Filed Oct. 12, 1945

INVENTOR.
EVERT M. OSTLUND
BY Percy P. Lantry
ATTORNEY

Patented June 26, 1951

2,557,994

UNITED STATES PATENT OFFICE 2,557,994

OBJECT DETECTOR

Evert Manuel Ostlund, Montclair, N. J., assignor to Federal Telephone and Radio Corporation, New York, N. Y., a corporation of Delaware Application October 12, 1945, Serial No. 622,044

4 Claims. (Cl. 175—182)

The present invention relates to devices for indicating or detecting discontinuities in a medium, such as for example, object detectors and particularly mine detectors.

An object of the present invention is the provision of an improved detector for detecting discontinuities in material.

Another object of the present invention is the provision of an improved detector for detecting discontinuities not only between magnetic and non-magnetic materials, but also for detecting discontinuities in non-magnetic materials.

Another object of the present invention is the provision of an improved detector which indicates whether the discontinuity is due to magnetic or non-magnetic materials.

A further object of the present invention is the provision of an improved detector for determining whether the discontinuity is due to the presence of a small body or to a general change in the medium surveyed.

A still further object of the present invention is the provision of an improved land mine detector.

Figure 1:
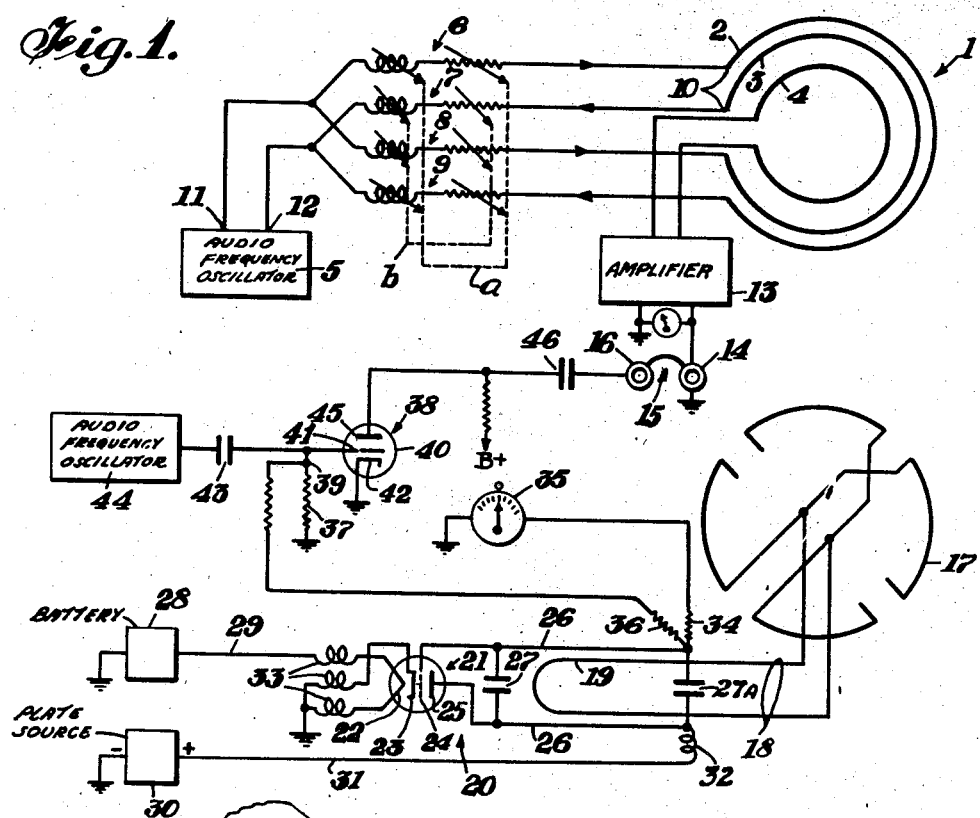
Figure 2:
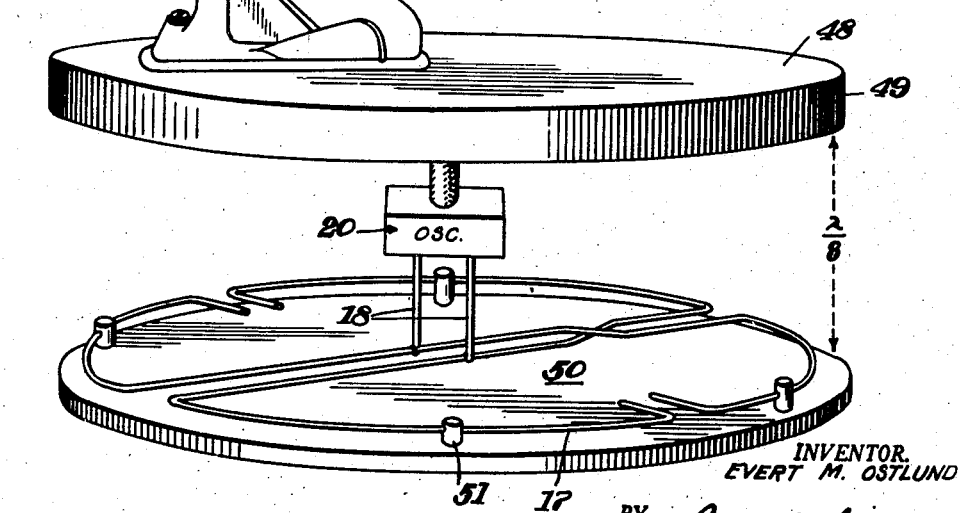

Other and further objects of the present invention will become apparent and the invention will be best understood from the following description of an embodiment thereof, reference being had to the drawings, in which:

Fig. 1 is a schematic and block diagram of a land mine detector embodying my invention; and Fig. 2 is a perspective view of the lower end of such a detector showing the arrangement of the electromagnetic searching coils and the antenna of the embodiment illustrated in Fig. 1.

In accordance with my invention, I detect discontinuities by the use of both an electromagnetic and a radiation field. These fields are moved about close to the ground until a discontinuity is met. If the discontinuity is due to a metallic substance, then the electromagnetic and radiated fields are altered. If the discontinuity is due to a non-metallic material, then the radiation field only is affected. Suitable indicating means are provided to indicate changes in said fields.

The electromagnetic field is produced by a coil arrangement generally indicated by the numeral 1 consisting of two windings, an outer winding 2 and an intermediate winding 3 fairly close to the outer winding 2. An inner winding 4 is inductively coupled to windings 2 and 3. The windings 2, 3 and 4 may be concentric. The current for producing the electromagnetic field is derived from an audio frequency oscillator 5. The four ends of windings 2 and 3 are connected through variable phase-shifting networks 6, 7, 8, and 9, each consisting of a variable resistance in series with a variable inductance, to the oscillator 5 so that the current from said oscillator flows in opposite directions through the windings 2 and 3. For this purpose the adjacent ends (indicated at 10) of windings 2 and 3 are respectively connected to terminals 11 and 12 of oscillator 5 through phase shifters 6 and 7 respectively, while the other ends of said windings 2 and 3 are respectively connected to terminals 12 and 11 respectively of oscillator 5 through phase shifters 9 and 8 respectively. The phase of the current through winding 2 is controlled by phase shifters 6 and 9, which may be ganged together as indicated by the dotted line a, while the phase of the current through winding 3 is controlled by phase shifters 7 and 8, which may likewise be ganged together as indicated by the dotted line b. These pairs of phase shifters may also be ganged together to a single control which varies phase shifters 6 and 9 oppositely to phase shifters 7 and 8. The relative phase of the energy passing through windings 2 and 3 is adjusted so that normally the electromagnetic fields set up in windings 2 and 3 will cancel or neutralize each other, it being apparent from the connections hereinbefore described, that current flows in opposite directions through said windings 2 and 3. The winding 4 is connected to an amplifier 13 having in its output one earphone 14, of a pair of earphones 15, having a second earphone 16. Since, normally the phase shifters 6—9 are adjusted so that the electromagnetic fields produced in windings 2 and 3 neutralize and cancel each other, no audio frequency energy is picked up by winding 4 and no sound is heard in earphone 14. The coil arrangement 1 is moved over the ground and when it is moved so that the electromagnetic field produced by windings 2 and 3 encounters a metallic substance, the fields will be unbalanced so that the field produced by one of said windings will be greater. The resulting energy induced in winding 4 is amplified and then heard in earphone 14, apprising the operator that a metallic substance has been encountered. Where, however, the discontinuity encountered is not due to a metallic substance, the arrangement hereinbefore described will not operate. For detecting non-metallic discontinuities a radiation field is provided. A discontinuity in the area adjacent the radiator changes the effective radiation resistance and produces an indicating signal. For a radiation field, I prefer to use one that is toroidal, that is, in the shape of a doughnut having a substantial minimum in the center. With such type of radiation field, the difference between a large discontinuity and a small one can be detected. If the object producing the discontinuity is small, as the field moves over it, the indication will first rise to a maximum, then fall to a minimum when the object is adjacent the center of the field, and as the center of the field moves way from the object the indication will rise to a maximum again and finally diminish as the perimeter of the field moves away from the object. On the other hand, if the discontinuity is a large one, only a single rise and fall in the indication will be produced.

While various types of antennas are known which will produce such a radiation field, I prefer to use the type of antenna described in Patent No. 2,283,897, granted to A. Alford on May 26, 1942. Referring back to Fig. 1, the loop antenna 17, which is constructed in accordance with said patent, is fed over a dual transmission line 18 by a pick-up loop 19 associated with a high frequency oscillator 20 which may operate, for example, in the range of the order of three hundred megacycles. The high frequency oscillator 20 includes an electron discharge device in the form of a triode 21 having a heater 22, cathode 23, grid 24, and anode 25. The oscillator 20 has a tuned grid-anode transmission line tank circuit generally indicated by the numeral 26, the tuning being accomplished by adjustable capacitive shorting means 27 and 27A associated with said transmission line circuit 26. Capacitor 27A is of negligible reactance to radio frequency. The pick-up loop 19 which is coupled to loop 17 is inductively fed from the transmission line circuit 26. The heater 22 is supplied with current from a source 28, one end of said heater being connected through a lead 29 to one side of the source 28 and the other end of said heater being connected through ground to the other side of said source 28. Anode-cathode potential is supplied from a source 30, the positive side of said source being connected over a lead 31 through a radio frequency choke coil 32 to the conductor of the transmission line circuit 26 which is connected to the anode 25. The negative side of the plate source 30 is connected to the cathode through ground and the usual radio frequency choke coils 33 are arranged in series with each of the cathode and heater leads.

The grid 24 is connected through a resistor 34 and an indicator 35 of such as an ammeter to ground. The grid 24 is also connected to ground through resistor 36 and a resistor 37, the resistor 37 being the grid resistor of an amplifier circuit 38. The constants of the high frequency oscillator 20 are adjusted so that normally a substantial grid current is produced which flows through resistor 34 and indicator 35 to ground, thereby moving the indicator to a given zero position which is used as a zero reference. Likewise normally current will flow from grid 24 through resistor 36 and resistor 37 to thereby produce a potential across resistor 37 making the upper end 39 of said resistor 37 negative with respect to ground. This bias is normally insufficient to block conductivity of the oscillator 38 which includes an electron discharge device 40 having its grid 41 connected with the end 39 of resistor 37 and its cathode 42 coupled to ground. Grid 41 is likewise coupled by means of a condenser 43 to the output of an audio frequency oscillator 44 which operates at a frequency quite distinct from that of the audio frequency oscillator 5 which is associated with the electromagnetic arrangement. As stated before, normally the grid current in oscillator 20 is insufficient to completely cut-off conduction in tube 40 and thus audio frequency signals appear on the anode 45, which anode is in turn coupled through a coupling condenser 46 to earphone 16 of the pair of earphones 15. Thus in earphone 16 sounds of the frequency of oscillation 44 are normally present. When, however, a discontinuity is encountered, the apparent radiation resistance of the loop antenna 17 is altered, which in turn alters the grid current of triode 21 and changes the bias on tube 40. The character of the terrain being scanned may vary, i. e. damp soil, dry soil, rocky soil, sandy soil, etc., but in each case the operator will initially note the reading of meter 35 and will adopt such reading as a reference point. When the earth is the medium which is being scanned for discontinuities, the presence of a discontinuity such as for example, a plastic mine, tends to cause an increase in the grid current of triode 21, whereas metallic substances tend to cause a decrease in said grid current. A metallic object in the field of radiation would act to reduce the impedance of the loop 19 thereby increasing the grid current of oscillator 20, while a non-metallic or dielectric object increases the impedance of said loop and thereby lowers the said grid current. When the grid current is altered, the sound appearing in earphone 16 is likewise altered, the presence of a non-metallic discontinuity increasing the grid current sufficiently so that tube 40 is blocked thereby preventing transmission of the audio frequency signal from oscillator 44 to the earphone 16. Likewise the indicator 35 is displaced from its normal or zero position also indicating the presence of a discontinuity or mine. Of course it will be understood that metallic substances will also affect the radiation field but it is preferred to detect these primarily on the electromagnetic coil arrangement 1.

The equipment described in Fig. 1 may be adapted to be carried by one person. The coil arrangement 1, the antenna loop 17 and the radio frequency oscillator 20 may be all suspended from one end of a hollow pole 47 having connecting cables passing therethrough while the rest of the equipment may be distributed on the person of the operator and at the other end of the pole 47.

In accordance with another feature of my invention, the coil arrangement 1 serves as a reflector for the antenna 17 so as to make said antenna unidirectional with its radiation field going downward instead of up toward the operator in which latter case the movements of the operator and/or the presence of objects above the ground might affect operation of the detector. For this purpose I prefer to mount the coil arrangement 1 on the under surface of a plate 48 having a circular flange 49, the plate 48 being fixed to the lower end of pole 47. The antenna loop 17 is then arranged on a plate 50 which is directly below plate 48 and parallel thereto. Plate 50 is supported from plate 48 (by means which has not been shown in order that the sketch may be clearer) approximately 1/8 below plate 48 to obtain maximum reflection. Plates 48 and 50 are both made of non-metallic material. The antenna loop 17 may be secured to plate 50 by means of small metallic studs 51 which may be screwed or otherwise secured in plate 50, and which may be soldered to loop 17 or which may have openings within which the loop 17 is rigidly secured. The oscillator 20 is preferably arranged either on plate 50 or suspended between plates 48 and 50 whichever is preferred.

While I have described above the principles of my invention in connection with specific apparatus, it is to be clearly understood that this description is made only by way of example and not as a limitation on the scope of my invention as defined in the accompanying claims.

I claim:

1. A detector comprising first and second means establishing respective radiation fields, said first means producing audio frequency oscillations, said second means producing high frequency oscillations in the range of the order of three hundred megacycles per second, indicating means, and means responsive to variations in any one of said fields to operate said indicating means, said first means being mounted in spaced relation adjacent the rear side of said second means whereby the radiation produced by said second means is caused to be unidirectional.

2. A detector comprising first and second means establishing respective radiation fields, said first means producing audio frequency oscillations, said second means producing high frequency oscillations in the range of the order of three hundred megacycles per second, indicating means, and means responsive to variations in any one of said fields to operate said indicating means, said first means including a coil, said second means including a radiant acting means, said coil being mounted as a reflector to the rear side of said radiant acting means.

3. A detector as claimed in claim 2 further including upper and lower plates and means supporting the plates in vertical space relation, and wherein said coil and said radiant-acting means are mounted on respective plates, said plates being adapted to be moved about in unison a short distance above the ground, said radiant-acting means being positioned upon the lower of the two plates, and said coil being positioned upon the upper plate.

4. A device for detecting discontinuities due to magnetic and non-magnetic materials which comprises first and second means establishing respective radiation fields, said first means including a coil antenna and adapted to produce audio frequency oscillations, said second means including a loop antenna and adapted to produce high frequency oscillations in the range of the order of three hundred magacycles per second, a pole and means supporting said antennas on said pole with the coil antennas disposed above said loop antenna.

EVERT MANUEL OSTLUND.

REFERENCES CITED

The following references are of record in the file of this patent:

UNITED STATES PATENTS

| Number | Name | Date |
|---|---|---|
| 2,048,591 | Berry | July 21, 1936 |
| 2,129,058 | Hedden | Sept. 6, 1938 |
| 2,205,881 | Franz | June 25, 1940 |
| 2,225,668 | Subkow et al. | Dec. 24, 1940 |
| 2,283,897 | Alford | May 26, 1942 |
| 2,376,659 | Chireix | May 22, 1945 |
| 2,390,409 | Aiken | Dec. 4, 1945 |

OTHER REFERENCES

"Locating Land Mines," article by Horni in Electronic Industries, Jan. 1945, pages 82, 83, 174, 175.